(12) United States Patent
Kato (10) Patent No.: US 11,848,157 B2
(45) Date of Patent: Dec. 19, 2023

(54) CERAMIC ELECTRONIC DEVICE AND MANUFACTURING METHOD OF THE SAME

(71) Applicant: TAIYO YUDEN CO., LTD., Tokyo (JP)

(72) Inventor: Yoichi Kato, Takasaki (JP)

(73) Assignee: TAIYO YUDEN CO., LTD., Tokyo (JP)

(*) Notice: Subject to any disclaimer, the term of this patent is extended or adjusted under 35 U.S.C. 154(b) by 8 days.

(21) Appl. No.: 17/694,148

(22) Filed: Mar. 14, 2022

(65) Prior Publication Data

US 2022/0319774 A1 Oct. 6, 2022

(30) Foreign Application Priority Data

Mar. 31, 2021 (JP) ................. 2021-061221

(51) Int. Cl.
| | | |
|---|---|---|
| *H01G 4/12* | (2006.01) | |
| *H01G 4/30* | (2006.01) | |
| *C04B 35/64* | (2006.01) | |
| *H01G 4/012* | (2006.01) | |
| *H01G 4/008* | (2006.01) | |

(52) U.S. Cl.
CPC ........... *H01G 4/1218* (2013.01); *C04B 35/64* (2013.01); *H01G 4/008* (2013.01); *H01G 4/012* (2013.01); *H01G 4/30* (2013.01)

(58) Field of Classification Search
CPC ...... H01G 4/1218; H01G 4/008; H01G 4/012; H01G 4/30; C04B 35/64
See application file for complete search history.

(56) References Cited

U.S. PATENT DOCUMENTS

| | | | |
|---|---|---|---|
| 2004/0256603 A1 | 12/2004 | Celik et al. | |
| 2013/0321980 A1* | 12/2013 | Suzuki | H01G 4/30 29/25.42 |
| 2015/0155098 A1 | 6/2015 | Yamaguchi et al. | |
| 2016/0155571 A1* | 6/2016 | Doi | H01G 4/12 156/89.16 |
| 2020/0035416 A1* | 1/2020 | Kwon | H01G 4/30 |
| 2021/0202171 A1* | 7/2021 | Tsutsui | H01G 4/012 |

FOREIGN PATENT DOCUMENTS

| | | |
|---|---|---|
| JP | 2005505695 A | 2/2005 |
| WO | 2014024538 A1 | 2/2014 |

* cited by examiner

*Primary Examiner* — Michael P McFadden
(74) *Attorney, Agent, or Firm* — Law Office of Katsuhiro Arai (57) ABSTRACT

A ceramic electronic device includes a multilayer structure in which each of a plurality of internal electrode layers and each of three or more of dielectric layers of which a main component is ceramic are alternately stacked. The three or more of dielectric layers include Sn. A dielectric layer having a smaller Sn concentration is closer to an outermost end in a stacking direction than a dielectric layer having a larger Sn concentration and being located on a center side of the stacking direction, in a relationship of at least two of the three or more of dielectric layers.

10 Claims, 7 Drawing Sheets

CERAMIC ELECTRONIC DEVICE AND MANUFACTURING METHOD OF THE SAME

CROSS-REFERENCE TO RELATED APPLICATION

This application is based upon and claims the benefit of priority of the prior Japanese Patent Application No. 2021-061221, filed on Mar. 31, 2021, the entire contents of which are incorporated herein by reference.

FIELD

A certain aspect of the present invention relates to a ceramic electronic device and a manufacturing method of the ceramic electronic device.

BACKGROUND

Multilayer ceramic electronic device such as multilayer ceramic capacitors have a structure in which internal electrode layers sandwich a dielectric layer and are stacked. Due to the ferroelectric characteristic of the dielectric layer sandwiched by the internal electrode layers, the multilayer ceramic electronic devices achieve a large electrostatic capacity density (for example, see International Publication No. 2014/024538).

SUMMARY OF THE INVENTION

According to an aspect of the present invention, there is provided a ceramic electronic device including: a multilayer structure in which each of a plurality of internal electrode layers and each of three or more of dielectric layers of which a main component is ceramic are alternately stacked, wherein the three or more of dielectric layers include Sn, wherein a dielectric layer having a smaller Sn concentration is closer to an outermost end in a stacking direction than a dielectric layer having a larger Sn concentration and being located on a center side of the stacking direction, in a relationship of at least two of the three or more of dielectric layers.

According to another aspect of the present invention, there is provided a manufacturing method of a ceramic electronic device including: forming stack units by forming each of internal electrode patterns including metal powder, on each of dielectric green sheets including ceramic powder and an Sn source; forming a multilayer structure by stacking three or more of the stack units; firing the multilayer structure, wherein a dielectric green sheet having a smaller Sn concentration is closer to an outermost end in a stacking direction than a dielectric green sheet having a larger Sn concentration and being located on a center side of the stacking direction, in a relationship of at least two of the dielectric green sheets before the firing.

DETAILED DESCRIPTION

A metal of the internal electrode layer may diffuse and solid-solved in a main component ceramic of the dielectric layer in a firing process. When the metal of the internal electrode layer is solid-solved in the main component ceramic of the dielectric layer, an oxygen defect is formed in the main component ceramic of the dielectric layer. Insulation characteristic of the dielectric layer is degraded. And, a lifetime of the ceramic electronic devices may be reduced.

Accordingly, Sn is solid-solved in the main component ceramic of the dielectric layer, solid solution of the main component metal of the internal electrode is suppressed. Insulation characteristic of the dielectric layer is improved. And, the lifetime ca be increased.

However, Sn promotes sintering of the dielectric layer and promotes spheroidizing of the internal electrode layer. It is therefore possible to improve the insulation characteristic of the dielectric layer by adding Sn. On the other hand, disarrangement of the multilayer structure caused by spheroidizing may decreases an electrostatic capacity.

A description will be given of an embodiment with reference to the accompanying drawings.

Figure 1:
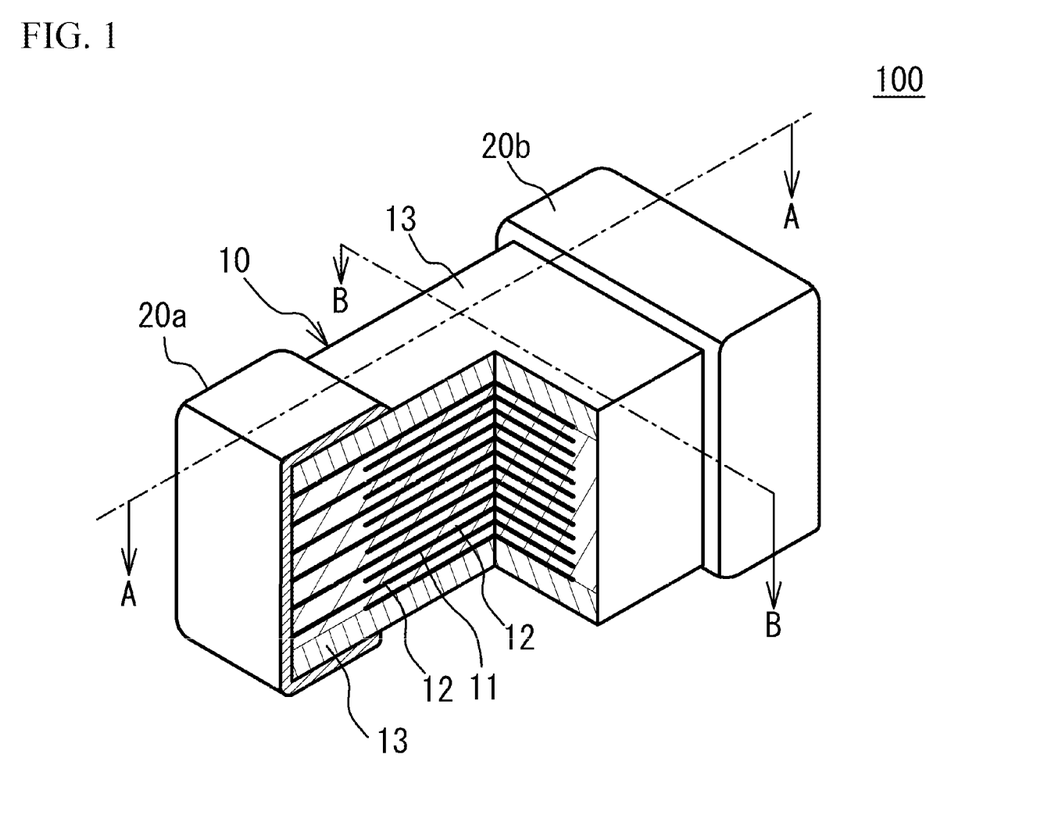
FIG. 1 illustrates a perspective view of a multilayer ceramic capacitor in which a cross section of a part of the multilayer ceramic capacitor is illustrated.
Figure 2:
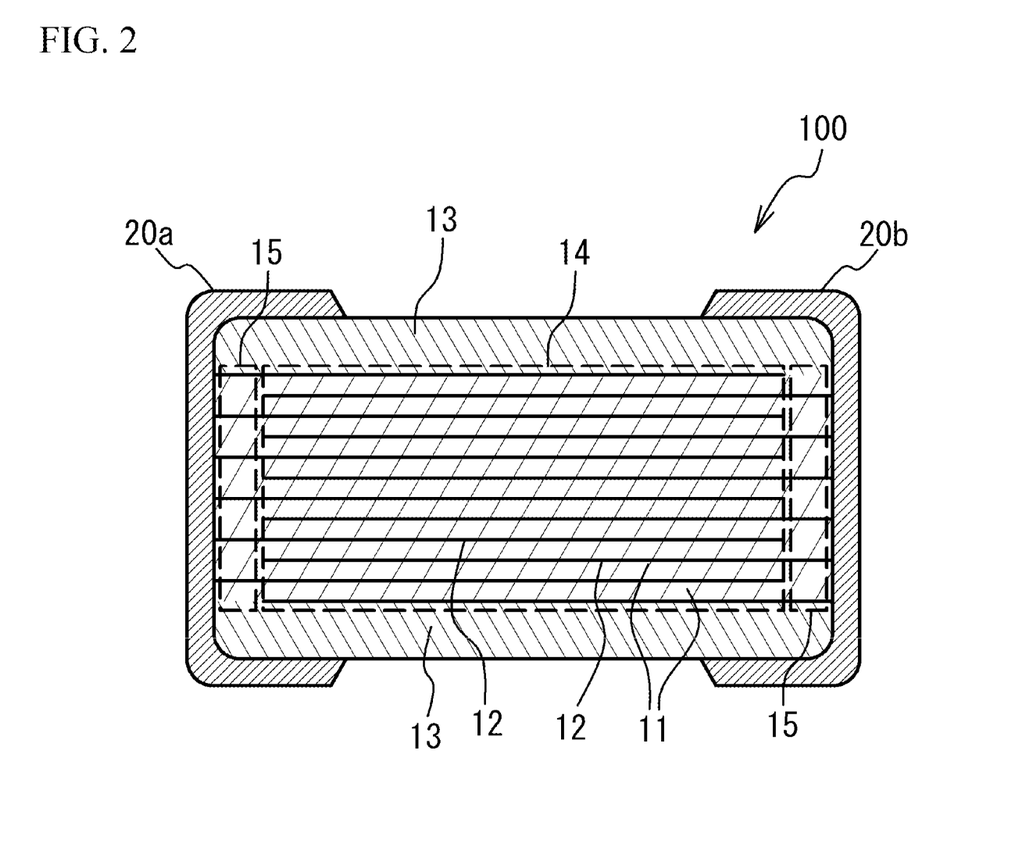
FIG. 2 illustrates a cross sectional view taken along a line A-A of FIG. 1.
Figure 3:
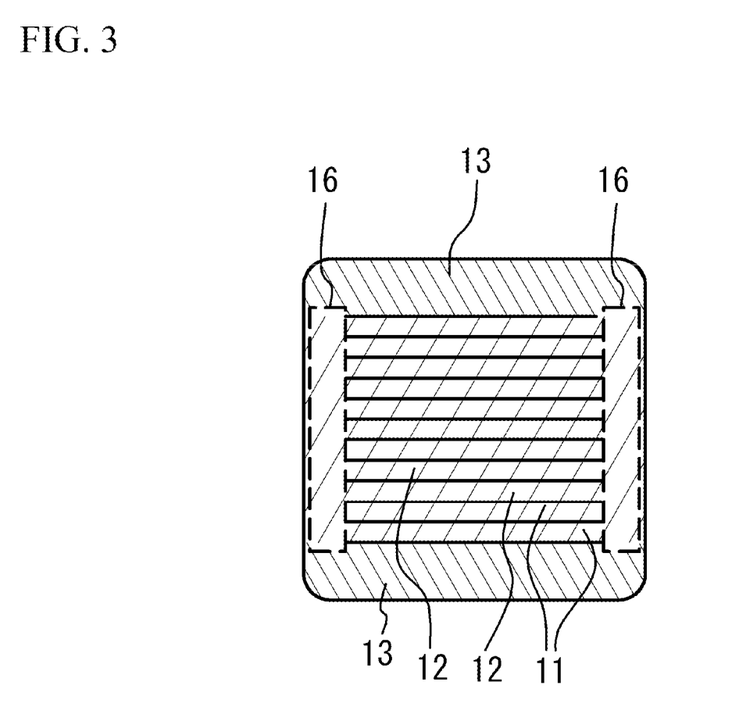
FIG. 3 illustrates a cross sectional view taken along a line B-B of FIG. 1.

(Embodiment) FIG. 1 illustrates a perspective view of a multilayer ceramic capacitor 100 in accordance with an embodiment, in which a cross section of a part of the multilayer ceramic capacitor 100 is illustrated. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face is opposite to the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In a multilayer structure of the dielectric layers 11 and the internal electrode layers 12, two of the internal electrode layers 12 are positioned at outermost layers in a stacking direction. The upper face and the lower face of the multilayer structure that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as Ni (nickel), Cu (copper), Sn (tin) or the like. A noble metal such as Pt (platinum), Pd (palladium), Ag (silver), Au (gold) or an alloy thereof may be used as the internal electrode layers 12.

The dielectric layers 11 are mainly composed of a ceramic material that is expressed by a general formula $ABO_3$ and has a perovskite structure. The perovskite structure includes $ABO_{3-\alpha}$, having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. An average thickness of each of the dielectric layers 11 may be, for example, 0.05 μm or more and 5 μm or less. The average thickness may be 0.1 μm or more and 3 μm or less. The average thickness may be 0.2 μm or more and 1 μm or less.

As illustrated in FIG. 2, a section, in which a set of the internal electrode layers 12 connected to the external electrode 20a face another set of the internal electrode layers 12 connected to the external electrode 20b, is a section generating electrical capacity in the multilayer ceramic capacitor 100. Accordingly, the section is referred to as a capacity section 14. That is, the capacity section 14 is a section in which the internal electrode layers next to each other being connected to different external electrodes face each other.

A section, in which the internal electrode layers 12 connected to the external electrode 20a face each other without sandwiching the internal electrode layer 12 connected to the external electrode 20b, is referred to as an end margin 15. A section, in which the internal electrode layers 12 connected to the external electrode 20b face each other without sandwiching the internal electrode layer 12 connected to the external electrode 20a is another end margin 15. That is, the end margin 15 is a section in which a set of the internal electrode layers 12 connected to one external electrode face each other without sandwiching the internal electrode layer 12 connected to the other external electrode. The end margins 15 are sections that do not generate electrical capacity in the multilayer ceramic capacitor 100.

As illustrated in FIG. 3, a section of the multilayer chip 10 from the two sides thereof to the internal electrode layers 12 is referred to as a side margin 16. That is, the side margin 16 is a section covering edges of the stacked internal electrode layers 12 in the extension direction toward the two side faces. The side margin 16 does not generate electrical capacity.

The multilayer chip 10 is obtained by stacking each layer of a powder material and firing the stacked layers. However, there may be a case where the main component metal of the internal electrode layers 12 is solid-solved in the main component ceramic of the dielectric layers 11 during the firing. For example, when the internal electrode layers 12 include Ni, a part of Ni is oxidized during the firing and ionized Ni is solid-solved in the main component ceramic of the dielectric layers 11. When the main component metal of the internal electrode layers 12 is solid-solved in the main component ceramic of the dielectric layers 11, oxygen defects are formed in the main component ceramic of the dielectric layers 11. In this case, the insulation characteristic of the dielectric layers 11 may be degraded and the lifetime of the multilayer ceramic capacitor 100 may be reduced.

Accordingly, it is thought that Sn is solid-solved in the main component ceramic of the dielectric layers 11. In this case, the solid-solution of the main component metal of the internal electrode layers 12 into the main component ceramic of the dielectric layers 11 is suppressed. The insulation characteristic of the dielectric layers 11 is improved. Therefore, the lifetime of the multilayer ceramic capacitor 100 can be increased.

However, Sn promotes the sintering of the dielectric layers 11 and promotes spheroidizing of the internal electrode layers 12. Therefore, when Sn is added to the dielectric layers 11, the insulation characteristic of the dielectric layers 11 can be improved. On the other hand, due to disarrangement of the multilayer structure caused by the spheroidizing of the internal electrode layers 12, the electrostatic capacity of the multilayer ceramic capacitor 100 may be reduced. In particular, the heat of a firing furnace is conducted to the multilayer chip before the firing from outside to inside. Therefore, a heat gradient easily occurs. For example, in a high speed temperature increasing of 100° C./min or more, the heat gradient easily becomes remarkable. When the heat gradient occurs, the outside sintering progresses more than the inside sintering. The spheroidizing of the internal electrode layer of outside easily occurs. And, the residual carbon-based material of the binder which prevents the sintering becomes gas from outside to inside and is guided to the atmosphere of the firing furnace. Therefore, the sintering of outside progresses more than the sintering of inside. In particular, the sintering of the outermost internal electrode layer easily becomes remarkable. Accordingly, the multilayer ceramic capacitor 100 of the embodiment has a structure for achieving both the high insulation resistance and the high electrostatic capacity.

Each of the dielectric layers 11 includes Sn in the multilayer ceramic capacitor 100. For example, Sn is solid-solved in the main component ceramic of each of the dielectric layers 11. Thus, solid solution of the main component metal of the internal electrode layers 12 into the main component ceramic of the dielectric layers 11 during the firing is suppressed. In this case, it is possible to improve the insulation characteristic of the dielectric layers 11. And it is possible to increase the lifetime of the multilayer ceramic capacitor 100. In a relationship among at least two in three or more of the dielectric layers 11, an Sn concentration of one or more of the dielectric layers 11 closer to the end side in the stacking direction is smaller than those of one or more of the dielectric layers 11 on the center side in the stacking direction. The one or more of the dielectric layers 11 on the center side in the stacking direction effectively achieve the improvement of the lifetime. The one or more of the dielectric layers 11 on the end side in the stacking direction suppress the spheroidizing of the internal electrode layers 12. Moreover, the reduction of the continuity modulus is effectively suppressed. The disarrangement of the multilayer structure is suppressed. And, the electrostatic capacity is effectively improved. Accordingly, both the high insulation characteristic and the high electrostatic capacity can be achieved. When the number of the stacked dielectric layers 11 is an even number, center dielectric layers are center two dielectric layers in the stacking direction. When the number of the stacked dielectric layers 11 is an odd number, a center dielectric layer is a center one dielectric layer in a stacking direction.

Figure 4A:
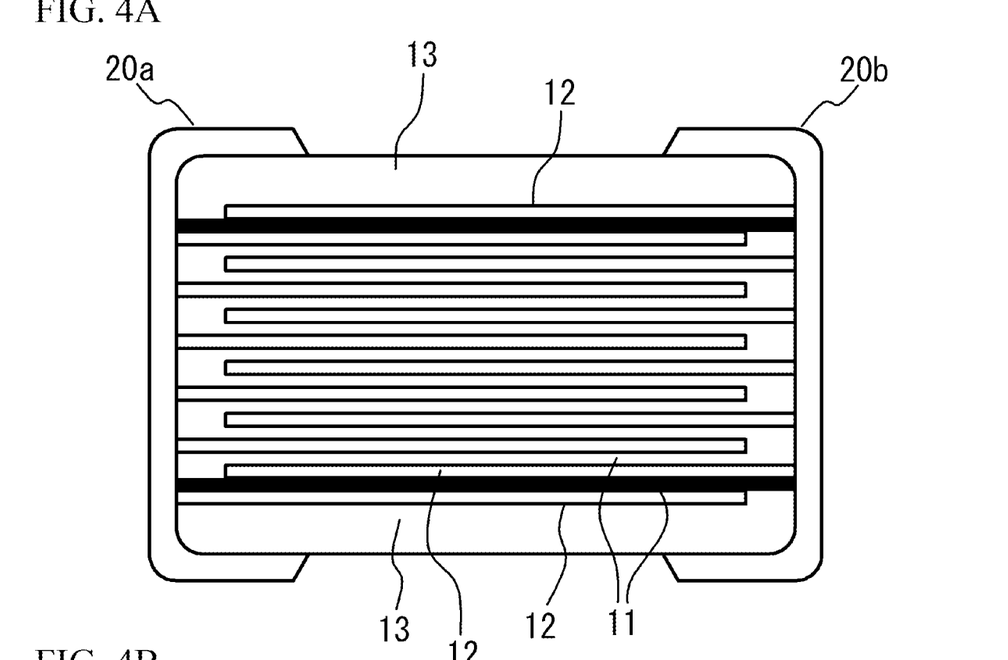
FIG. 4A and FIG. 4B illustrate a Sn concentration.

For example, as illustrated in FIG. 4A, it is preferable that the Sn concentration of the outermost dielectric layer 11 is the smallest from the center dielectric layer 11 or the center dielectric layers 11 to the outermost dielectric layer 11. In the structure, the suppression of the sintering is remarkable. In FIG. 4A, the outermost dielectric layer 11 in the stacking direction has a black color This means that the Sn concentration of the outermost dielectric layer 11 is the smallest.

Figure 4B:
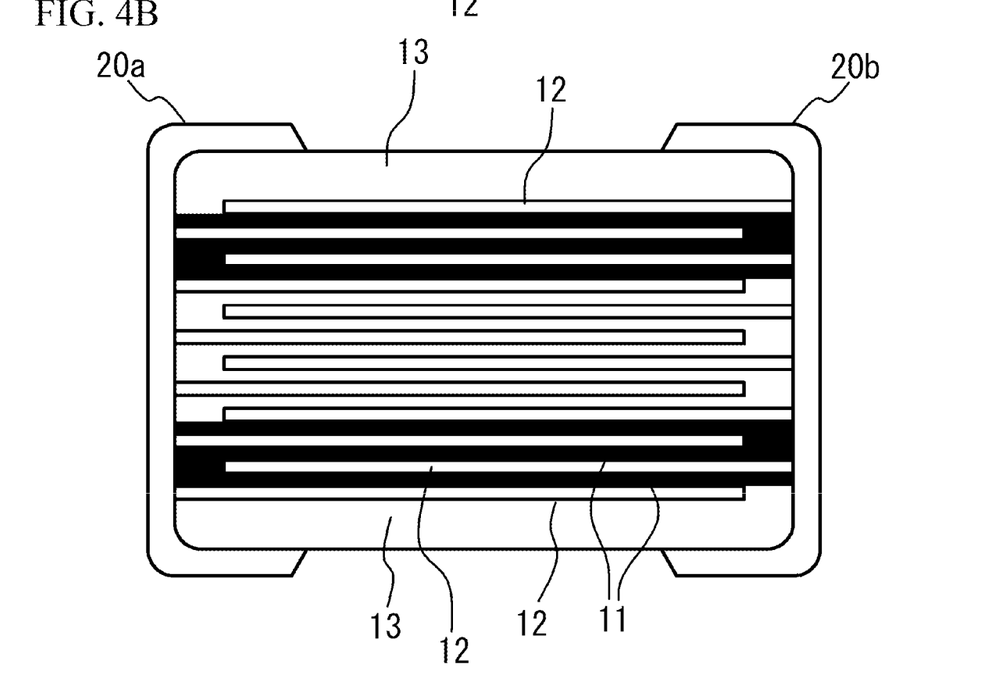

For example, as illustrated in FIG. 4B, it is preferable that the Sn concentrations of a plurality of dielectric layers 11 from the end to the center side in the stacking direction (the dielectric layers 11 in an outer section) are smaller than the Sn concentrations of the rest dielectric layers on the center side in the stacking direction (the dielectric layers in a center section). For example, when 400 numbers of the dielectric layers 11 are stacked, the Sn concentrations of 200 numbers of the dielectric layers 11 in the center of the stacking direction are larger than the Sn concentrations of each 100 numbers of the dielectric layers 11 of the both end sides in the stacking direction. In the structure, the suppression of the sintering is remarkable. In FIG. 4B, the dielectric layers 11 of which the Sn concentration is smaller are illustrated with black.

When the outer-layer section in which the Sn concentration is law is narrow in FIG. 4B, the effect of the suppression of the sintering may not be necessarily achieved. Accordingly, the range of the outer layer section has a lower limit. For example, it is preferable that the outer layer section is more than 0% from the upper end and the lower end to the center side in the stacking direction within the all dielectric layers 11. It is more preferable that the outer layer section is 5% or more. It is still more preferable that the outer-layer section is 10% or more.

On the other hand, when the outer layer section in which the Sn concentration is law is wide, the effect of the improvement of the lifetime may not be necessarily achieved. Accordingly, the range of the outer layer section has an upper limit. For example, it is preferable that the outer layer section is more than 40% or less from the upper end and the lower end to the center side in the stacking direction within the all dielectric layers 11. It is more preferable that the outer layer section is 30% or less. It is still more preferable that the outer layer section is 20% or less.

Figure 5:
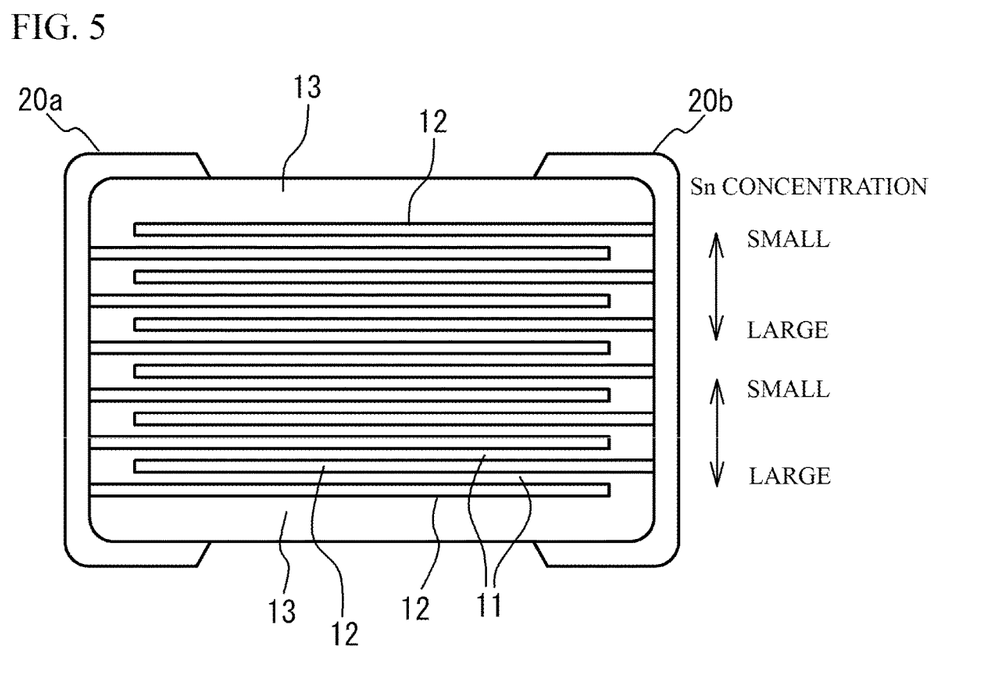
FIG. 5 illustrates a Sn concentration.

For example, as illustrated in FIG. 5, it is preferable that the Sn concentrations of the dielectric layers 11 from the center dielectric layer 11 or the center dielectric layers 11 in the stacking direction to the outermost dielectric layers 11 get smaller in steps or gradually from the center internal electrode layer 12 or the center internal electrode layers 12 to the outermost internal electrode layers 12 in the stacking direction. In the structure, the Sn concentrations of the dielectric layers 11 on the end sides of the stacking direction are smaller. Therefore, the suppression of the sintering is remarkable. The Sn concentrations of the dielectric layers 11 on the center side of the stacking direction are larger. Therefore, the improvement of the lifetime is remarkable.

When the Sn concentrations gradually get smaller, the Sn concentrations may continuously decrease (monotonous decrease) or the Sn concentrations may repeat up and down and entirely decrease when measuring Sn concentrations at a plurality of sample points from the center dielectric layer 11 or the center dielectric layers 11 in the stacking direction to the outermost dielectric layers 11.

The thickness of the internal electrode layers 12 may be 0.01 μm or more and 5 μm or less. The thickness may be 0.05 μm or more and 3 μm or less. The thickness may be 0.1 μm or more and 1 μm or less. For example, when the thickness of the internal electrode layers 12 is 1 μm or less, the continuity modulus may be reduced because of breaking during the firing. In this case, the effect of the embodiment may be remarkable. In the multilayer ceramic capacitor 100, the number of the internal electrode layers 12 may be 10 to 5000, 50 to 4000, or 100 to 3000.

When each Sn concentration of the dielectric layers 11 is large, the spheroidizing of the internal electrode layers 12 progresses. In this case, the electrostatic capacity of the multilayer ceramic capacitor 100 may be reduced. Accordingly, it is preferable that each Sn concentration of the dielectric layers 11 has an upper limit. For example, it is preferable that each Sn concentration of the dielectric layers 11 is 5 at % or less. It is more preferable that each Sn concentration is 3 at % or less. It is still more preferable that each Sn concentration is 2 at % or less. The "at % of Sn means a ratio of the number of Sn atoms on a presumption that the amount of the main component ceramic is 100 at %. When the main component ceramic of the dielectric layers 11 has the perovskite structure, the "at % of Sn means a ratio of the number of Sn atoms on a presumption that the amount of the B site element of the main component ceramic is 100 at %.

On the other hand, when each Sn concentration of the dielectric layers 11 is small, the diffusion of the metal component of the internal electrode layers 12 into the dielectric layers 11 may not be necessarily suppressed. Accordingly, it is preferable that each Sn concentration of the dielectric layers 11 has a lower limit. For example, it is preferable that each Sn concentration of the dielectric layers 11 is 0.1 at % or more. It is more preferable that each Sn concentration of the dielectric layers 11 is 0.5 at % or more. It is still more preferable that each Sn concentration of the dielectric layers 11 is 1 at % or more.

For example, in each Sn concentration of the dielectric layers 11, it is preferable that the ratio of the minimum Sn concentration and the maximum Sn concentration is 2:3 or less. It is more preferable that the ratio is 1:3 or less. It is still more preferable that the ratio is 1:5 or less. In each Sn concentration of the dielectric layers 11, it is preferable that a difference between the minimum element ratio of Sn/B site and the maximum element ratio of Sn/B site is 0.001 or more. It is more preferable that the difference is 0.005 or more. It is still more preferable that the difference is 0.01 or more.

Figure 6:
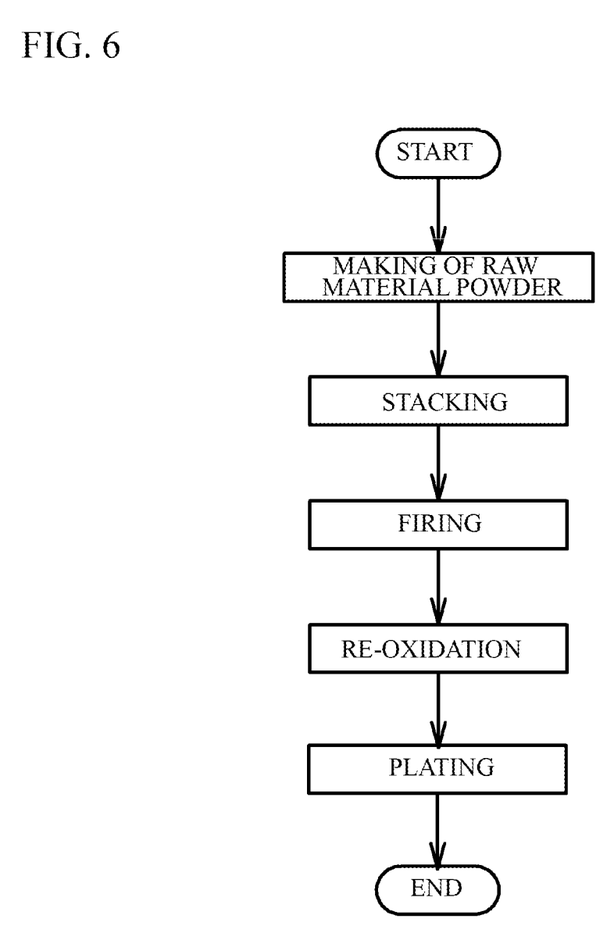
FIG. 6 illustrates a manufacturing method of a multilayer ceramic capacitor.

Next, a description will be given of a manufacturing method of the multilayer ceramic capacitor 100. FIG. 6 illustrates a manufacturing method of the multilayer ceramic capacitor 100.

(Making process of raw material powder) A dielectric material for forming the dielectric layer 11 is prepared. The dielectric material includes the main component ceramic of the dielectric layer 11. Generally, an A site element and a B site element are included in the dielectric layer 11 in a sintered phase of grains of $ABO_3$. For example, $BaTiO_3$ is tetragonal compound having a perovskite structure and has a high dielectric constant. Generally, BaTiO$_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used. The embodiment may use any of these methods.

An additive compound may be added to the resulting ceramic powder, in accordance with purposes. The additive compound may be an oxide of tin (Sn), magnesium (Mg), manganese (Mn), vanadium (V), chromium (Cr) or a rare earth element (yttrium (Y), samarium (Sm), europium (Eu), gadolinium (Gd), terbium (Tb), dysprosium Dy), holmium (Ho), erbium (Er), thulium (Tm) and ytterbium (Yb)), or an oxide of cobalt (Co), nickel (Ni), lithium (Li), boron (B), sodium (Na), potassium (K) and silicon (Si). The additive compound may be a glass including cobalt, nickel, lithium, boron, sodium, potassium or silicon.

For example, the resulting ceramic raw material powder is wet-blended with additives and is dried and crushed. Thus, a ceramic material is obtained. For example, the grain diameter may be adjusted by crushing the resulting ceramic material as needed. Alternatively, the grain diameter of the resulting ceramic power may be adjusted by combining the crushing and classifying. With the processes, a dielectric material is obtained.

(Stacking process) Next, a binder such as polyvinyl butyral (PVB) resin, an organic solvent such as ethanol or toluene, and a plasticizer are added to the resulting dielectric material and wet-blended. With use of the resulting slurry, a dielectric green sheet 52 is painted on a base material 51 by, for example, a die coater method or a doctor blade method, and then dried. The base material 51 is, for example, PET (polyethylene terephthalate) film.

Figure 7A:
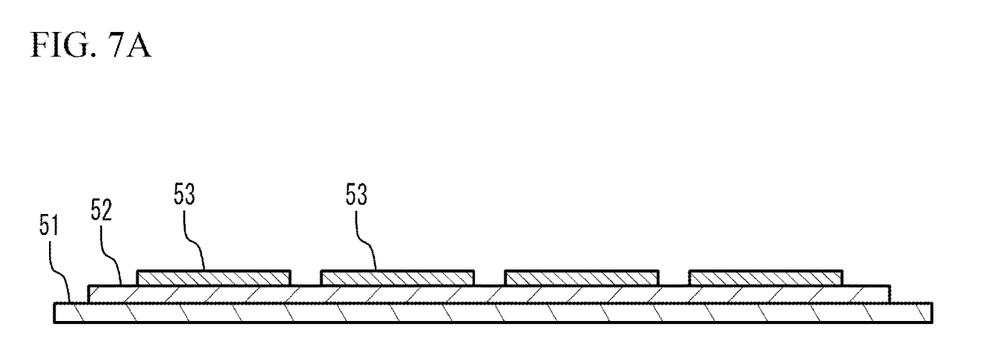
FIG. 7A and FIG. 7B illustrate a stacking process.

Next, as illustrated in FIG. 7A, an internal electrode pattern 53 is formed on the dielectric green sheet 52. In FIG. 7A, as an example, four parts of the internal electrode pattern 53 are formed on the dielectric green sheet 52 and are spaced from each other. The forming method is not limited. For example, electrode paste including Ni—Sn alloy powder or a mixture of Ni powder and Sn powder may be used. A vacuum deposition method such as a sputtering method using a Nu-Sn alloy target may be performed. A simultaneous sputtering using individual targets of Ni and Sn may be performed. The dielectric green sheet 52 on which the internal electrode pattern 53 is formed is a stack unit.

Figure 7B:
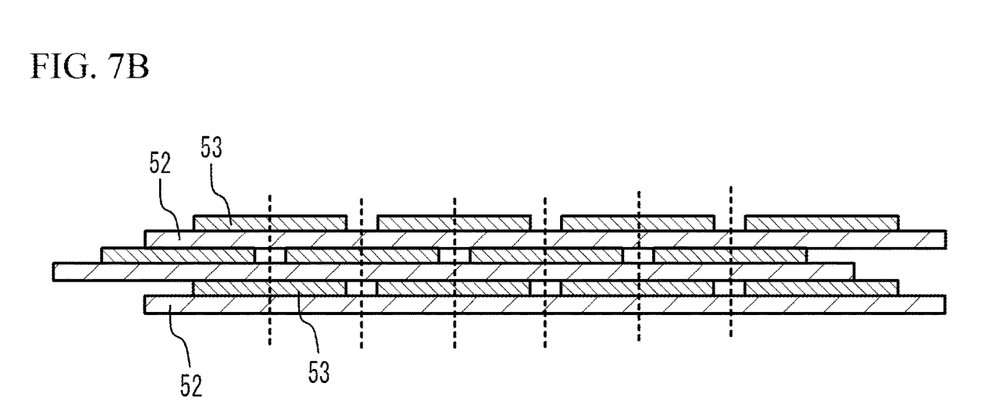

Next, the dielectric green sheets 52 are peeled from the base materials 51. As illustrated in FIG. 7B, three or more of the stack units are stacked. In this case, the Sn concentration of the dielectric green sheet on the end side is smaller than the Sn concentration of the dielectric green sheet on the center side in the stacking direction, in at least two of the dielectric green sheets. The Sn concentration each dielectric green sheet may be adjusted so that the distribution of the Sn concentration of FIG. 4A to FIG. 5.

A predetermined number (for example, 2 to 10) of a cover sheet is stacked on an upper face and a lower face of a ceramic multilayer structure of the stacked stack units and is thermally clamped. The resulting ceramic multilayer structure is cut into a chip having a predetermined size (for example, 1.0 mm×0.5 mm). In FIG. 7B, the multilayer structure is cut along a dotted line. The components of the cover sheet may be the same as those of the dielectric green sheet 52. Additives of the cover sheet may be different from those of the dielectric green sheet 52.

(Firing process) The binder is removed from the ceramic multilayer structure in N$_2$ atmosphere. Metal paste to be the base layers of the external electrodes 20a and 20b is applied to the ceramic multilayer structure by a dipping method. The resulting ceramic multilayer structure is fired for 10 minutes to 2 hours in a reductive atmosphere having an oxygen partial pressure of $10^{-5}$ to $10^{-8}$ atm in a temperature range of 1100 degrees C. to 1300 degrees C. In this manner, it is possible to manufacture the multilayer ceramic capacitor 100.

(Re-oxidizing process) After that, a re-oxidizing process may be performed in N$_2$ gas atmosphere in a temperature range of 600 degrees C. to 1000 degrees C.

(Plating process) After that, by a plating method, metal layers such as Cu, Ni, Sn or the like may be plated on the external electrodes 20a and 20b.

In the manufacturing method of the embodiment, in the relationship among at least two layers from the center dielectric layer 11 or the dielectric layers 11 in the stacking direction to the outermost dielectric layer 11, the dielectric layer 11 of which the Sn concentration is smaller is located closer to the end side in the stacking direction than the dielectric layer 11 of which the Sn concentration is larger. Accordingly, both the high insulation characteristic and the high electrostatic capacity of the multilayer ceramic capacitor 100 can be achieved.

In the embodiments, the multilayer ceramic capacitor is described as an example of ceramic electronic devices. However, the embodiments are not limited to the multilayer ceramic capacitor. For example, the embodiments may be applied to another electronic device such as varistor or thermistor.

EXAMPLES

The multilayer ceramic capacitors in accordance with the embodiment were made and the property was measured.

(Example 1) An additive was added to barium titanate powder. The additive and the barium titanate powder were sufficiently wet-blended and crushed in a ball mill. Thus, a dielectric material was made. Butyral-based material acting as an organic binder, and toluene and ethanol acting as a solvent were added to the dielectric material. And, the dielectric green sheet was made on a base material of PET by a doctor blade method. Next, an internal electrode pattern was formed on the dielectric green sheet by using paste including Ni powder.

Next, the dielectric green sheet was peeled from the base material. A plurality of the stack units were stacked. The number of the stack units was 400. Next, a predetermined number of a cover sheet was stacked on an upper face and a lower face of the ceramic multilayer structure of the stacked stack units and was thermally clamped. After that, the resulting ceramic multilayer structure was cut into a chip having a predetermined size (1.0 mm×0.5 mm×0.5 mm). The added amount of Sn with respect to Ti was 0.50 at % in the 200 numbers of the dielectric green sheets in the center portion in the stacking direction (center section). The added amount of Sn with respect to Ti was 0.25 at % in the 100 numbers of the dielectric green sheets in the upper portion in the stacking direction (outer layer section) and the 100 numbers of the dielectric green sheets in the lower portion in the stacking direction (outer layer section).

The binder was removed from the ceramic multilayer structure in N$_2$ atmosphere. Metal paste to be the base layers of the external electrodes was applied to the ceramic multilayer structure by a dipping method. The ceramic multilayer structure was fired in a reductive atmosphere.

After the firing, the atomic concentration ratio of Sn with respect to Ti in the 200 numbers of dielectric layers in the center portion in the stacking direction (center section) was 0.004. The atomic concentration ratio of Sn with respect to Ti was 0.001 in the 100 numbers of the dielectric layers in the upper portion in the stacking direction (outer layer section) and the 100 numbers of the dielectric layers in the lower portion in the stacking direction (outer layer section). The vicinity of the center of the chip was cut with use of a slicer. The cut cross section was grinded so that a clean cross section is obtained with use of an ion milling device. The cross section was subjected to a laser ablation ICP mass spectrometry. The amount of elements were measured. Thus, the element concentration ratio of Sn with respect to Ti was measured. The spot diameter of the heating laser was 3 μm.

(Example 2) In an example 2, the added amount of Sn with respect to Ti was 1.00 at % in the 200 numbers of the dielectric green sheets in the center portion in the stacking direction (center section). The added amount of Sn with respect to Ti was 0.50 at % in the 100 numbers of the dielectric green sheets in the upper portion in the stacking direction (outer layer section) and the 100 numbers of the dielectric green sheets in the lower portion in the stacking direction (outer layer section). Other conditions were the same as those of the example 1.

After the firing, the atomic concentration ratio of Sn with respect to Ti in the 200 numbers of dielectric layers in the center portion in the stacking direction (center section) was 0.009. The atomic concentration ratio of Sn with respect to Ti was 0.004 in the 100 numbers of the dielectric layers in the upper portion in the stacking direction (outer layer section) and the 100 numbers of the dielectric layers in the lower portion in the stacking direction (outer layer section).

(Example 3) In an example 3, the added amount of Sn with respect to Ti was 2.00 at % in the 200 numbers of the dielectric green sheets in the center portion in the stacking direction (center section). The added amount of Sn with respect to Ti was 1.00 at % in the 100 numbers of the dielectric green sheets in the upper portion in the stacking direction (outer layer section) and the 100 numbers of the dielectric green sheets in the lower portion in the stacking direction (outer layer section). Other conditions were the same as those of the example 1.

After the firing, the atomic concentration ratio of Sn with respect to Ti in the 200 numbers of dielectric layers in the center portion in the stacking direction (center section) was 0.019. The atomic concentration ratio of Sn with respect to Ti was 0.010 in the 100 numbers of the dielectric layers in the upper portion in the stacking direction (outer layer section) and the 100 numbers of the dielectric layers in the lower portion in the stacking direction (outer layer section).

(Example 4) In an example 4, the added amount of Sn with respect to Ti was 2.00 at % in the 200 numbers of the dielectric green sheets in the center portion in the stacking direction (center section). The added amount of Sn with respect to Ti was 1.50 at % in the 100 numbers of the dielectric green sheets in the upper portion in the stacking direction (outer layer section) and the 100 numbers of the dielectric green sheets in the lower portion in the stacking direction (outer layer section). Other conditions were the same as those of the example 1.

After the firing, the atomic concentration ratio of Sn with respect to Ti in the 200 numbers of dielectric layers in the center portion in the stacking direction (center section) was 0.020. The atomic concentration ratio of Sn with respect to Ti was 0.016 in the 100 numbers of the dielectric layers in the upper portion in the stacking direction (outer layer section) and the 100 numbers of the dielectric layers in the lower portion in the stacking direction (outer layer section).

(Comparative example 1) In a comparative example 1, the added amount of Sn with respect to Ti was 0.00 at % in the 200 numbers of the dielectric green sheets in the center portion in the stacking direction (center section). The added amount of Sn with respect to Ti was 0.00 at % in the 100 numbers of the dielectric green sheets in the upper portion in the stacking direction (outer layer section) and the 100 numbers of the dielectric green sheets in the lower portion in the stacking direction (outer layer section). That is, Sn was not added to any of the dielectric green sheets. Other conditions were the same as those of the example 1.

After the firing, the atomic concentration ratio of Sn with respect to Ti in the 200 numbers of dielectric layers in the center portion in the stacking direction (center section) was 0.000. The atomic concentration ratio of Sn with respect to Ti was 0.000 in the 100 numbers of the dielectric layers in the upper portion in the stacking direction (outer layer section) and the 100 numbers of the dielectric layers in the lower portion in the stacking direction (outer layer section).

(Comparative example 2) In a comparative example 2, the added amount of Sn with respect to Ti was 0.50 at % in the 200 numbers of the dielectric green sheets in the center portion in the stacking direction (center section). The added amount of Sn with respect to Ti was 1.00 at % in the 100 numbers of the dielectric green sheets in the upper portion in the stacking direction (outer layer section) and the 100 numbers of the dielectric green sheets in the lower portion in the stacking direction (outer layer section). Other conditions were the same as those of the example 1.

After the firing, the atomic concentration ratio of Sn with respect to Ti in the 200 numbers of dielectric layers in the center portion in the stacking direction (center section) was 0.005. The atomic concentration ratio of Sn with respect to Ti was 0.010 in the 100 numbers of the dielectric layers in the upper portion in the stacking direction (outer layer section) and the 100 numbers of the dielectric layers in the lower portion in the stacking direction (outer layer section).

(Comparative example 3) In a comparative example 3, the added amount of Sn with respect to Ti was 1.00 at % in the 200 numbers of the dielectric green sheets in the center portion in the stacking direction (center section). The added amount of Sn with respect to Ti was 1.00 at % in the 100 numbers of the dielectric green sheets in the upper portion in the stacking direction (outer layer section) and the 100 numbers of the dielectric green sheets in the lower portion in the stacking direction (outer layer section). Other conditions were the same as those of the example 1.

After the firing, the atomic concentration ratio of Sn with respect to Ti in the 200 numbers of dielectric layers in the center portion in the stacking direction (center section) was 0.009. The atomic concentration ratio of Sn with respect to Ti was 0.010 in the 100 numbers of the dielectric layers in the upper portion in the stacking direction (outer layer section) and the 100 numbers of the dielectric layers in the lower portion in the stacking direction (outer layer section).

(Comparative example 4) In a comparative example 4, the added amount of Sn with respect to Ti was 1.00 at % in the 200 numbers of the dielectric green sheets in the center portion in the stacking direction (center section). The added amount of Sn with respect to Ti was 2.00 at % in the 100 numbers of the dielectric green sheets in the upper portion in the stacking direction (outer layer section) and the 100 numbers of the dielectric green sheets in the lower portion in the stacking direction (outer layer section). Other conditions were the same as those of the example 1.

After the firing, the atomic concentration ratio of Sn with respect to Ti in the 200 numbers of dielectric layers in the center portion in the stacking direction (center section) was 0.011. The atomic concentration ratio of Sn with respect to Ti was 0.018 in the 100 numbers of the dielectric layers in the upper portion in the stacking direction (outer layer section) and the 100 numbers of the dielectric layers in the lower portion in the stacking direction (outer layer section).

(Comparative example 5) In a comparative example 5, the added amount of Sn with respect to Ti was 2.00 at % in the 200 numbers of the dielectric green sheets in the center portion in the stacking direction (center section). The added amount of Sn with respect to Ti was 2.00 at % in the 100 numbers of the dielectric green sheets in the upper portion in the stacking direction (outer layer section) and the 100 numbers of the dielectric green sheets in the lower portion in the stacking direction (outer layer section). Other conditions were the same as those of the example 1.

After the firing, the atomic concentration ratio of Sn with respect to Ti in the 200 numbers of dielectric layers in the center portion in the stacking direction (center section) was 0.020. The atomic concentration ratio of Sn with respect to Ti was 0.020 in the 100 numbers of the dielectric layers in the upper portion in the stacking direction (outer layer section) and the 100 numbers of the dielectric layers in the lower portion in the stacking direction (outer layer section).

(Comparative example 6) In a comparative example 6, the added amount of Sn with respect to Ti was 2.00 at % in the 200 numbers of the dielectric green sheets in the center portion in the stacking direction (center section). The added amount of Sn with respect to Ti was 4.00 at % in the 100 numbers of the dielectric green sheets in the upper portion in the stacking direction (outer layer section) and the 100 numbers of the dielectric green sheets in the lower portion in the stacking direction (outer layer section). Other conditions were the same as those of the example 1.

After the firing, the atomic concentration ratio of Sn with respect to Ti in the 200 numbers of dielectric layers in the center portion in the stacking direction (center section) was 0.021. The atomic concentration ratio of Sn with respect to Ti was 0.037 in the 100 numbers of the dielectric layers in the upper portion in the stacking direction (outer layer section) and the 100 numbers of the dielectric layers in the lower portion in the stacking direction (outer layer section).

A lifetime (50% value) was measured, with respect to each of the examples 1 to 4 and the comparative examples 1 to 6. In the measurement method, a time of each sample, at which the current value exceeds 2 mA when DC 8V was applied in a thermostatic chamber at 120 degrees C., was measured as the lifetime. The lifetime was measured with respect to 100 samples of each of the examples 1 to 4 and the comparative examples 1 to 6.

An electrostatic capacity was measured with respect to each of the examples 1 to 4 and the comparative examples 1 to 6. In the measurement method, the electrostatic capacity was measured at 120 Hz and 0.5 Vrms with use of an LCR meter. The measurement was performed after 24 hours after returning the temperature to a room temperature after keeping each sample in a thermostatic chamber at 150 degrees C. four 1 hour.

The continuity modulus of the internal electrode layers in the center section in the stacking direction and the continuity modulus of the internal electrode layers in the outer layer section were measured, with respect each of the examples 1 to 4 and the comparative examples 1 to 6. The vicinity of the center of the chip was cut with use of a slicer. The cut cross section was grinded so that a clean cross section is obtained with use of an ion milling device. The cross section was observed by an SEM. The continuity modulus was measured by dividing a total length of electrodes of each internal electrode layer by the width of the SEM image. Three SEM images of the 5 k magnification were captured by shifting positions in the planar direction. "n" number was 5. An average value of the continuity modulus of 15 SEM images was adopted.

Table 1 and Table 2 show the measured results. When a lifetime of a sample was improved by 10% or more with respect to the comparative example 1 and a capacity reduction rate of the sample was within 10% with respect to the comparative example 1, the sample was determined as good "O". The lifetimes of the comparative examples 2 to 6 were longer than that of the comparative example 1. It is thought that this was because Sn was added to the dielectric layers. However, the capacity reduction rates of the comparative examples 2 to 6 were more than 10% with respect to the comparative example 1. Therefore, the comparative examples 2 to 6 were determined as bad "x". It is thought that this was because the Sn concentration of the outer layer section was larger than that of the center section, the spheroidizing of the internal electrode layers of the outer layer section progressed, and the disarrangement of the multilayer structure got larger. In contrast, the lifetimes of the examples 1 to 4 were longer than that of the comparative example 1. And, the capacity reduction rates were within 10% with respect to the comparative example 1. Therefore, the examples 1 to 4 were determined as good "O". It is thought that this was because the Sn concentration of the outer layer section was smaller than that of the center section, and the spheroidizing of the internal electrode layers of the outer layer section was suppressed. The lifetime of the comparative example 1 was not sufficiently long. Therefore, the comparative example 1 was determined as bad "x".

TABLE 1

|  | Sn AMOUNT OF CENTER SECTION (at %) | Sn AMOUNT OF OUTER LAYER SECTION (at %) | LIFETIME 50% VALUE (min) | ELECTROSTATIC CAPACITY (μF) |
|---|---|---|---|---|
| EXAMPLE 1 | 0.50 | 0.25 | 344 | 4.13 |
| EXAMPLE 2 | 1.00 | 0.50 | 355 | 4.06 |
| EXAMPLE 3 | 2.00 | 1.00 | 368 | 3.94 |
| EXAMPLE 4 | 2.00 | 1.50 | 372 | 3.84 |
| COMPARATIVE EXAMPLE 1 | 0.00 | 0.00 | 312 | 4.21 |
| COMPARATIVE | 0.50 | 1.00 | 353 | 3.78 |

TABLE 1-continued

|  | Sn AMOUNT OF CENTER SECTION (at %) | Sn AMOUNT OF OUTER LAYER SECTION (at %) | LIFETIME 50% VALUE (min) | ELECTROSTATIC CAPACITY (μF) |
|---|---|---|---|---|
| EXAMPLE 2 |  |  |  |  |
| COMPARATIVE EXAMPLE 3 | 1.00 | 1.00 | 362 | 3.74 |
| COMPARATIVE EXAMPLE 4 | 1.00 | 2.00 | 370 | 3.66 |
| COMPARATIVE EXAMPLE 5 | 2.00 | 2.00 | 375 | 3.74 |
| COMPARATIVE EXAMPLE 6 | 2.00 | 4.00 | 370 | 3.45 |

TABLE 2

|  | CENTER SECTION Sn/Ti | UPPERMOST AND LOWERMOST Sn/Ti | CONTINUITY MODULUS (CENTER SECTION) (%) | CONTINUITY MODULUS (OUTER LAYER SECTION) (%) | DETERMINATION |
|---|---|---|---|---|---|
| EXAMPLE 1 | 0.004 | 0.001 | 91 | 95 | ○ |
| EXAMPLE 2 | 0.009 | 0.004 | 90 | 93 | ○ |
| EXAMPLE 3 | 0.019 | 0.010 | 89 | 92 | ○ |
| EXAMPLE 4 | 0.020 | 0.016 | 89 | 90 | ○ |
| COMPARATIVE EXAMPLE 1 | 0.000 | 0.000 | 92 | 96 | x |
| COMPARATIVE EXAMPLE 2 | 0.005 | 0.010 | 91 | 92 | x |
| COMPARATIVE EXAMPLE 3 | 0.009 | 0.010 | 90 | 92 | x |
| COMPARATIVE EXAMPLE 4 | 0.011 | 0.018 | 90 | 90 | x |
| COMPARATIVE EXAMPLE 5 | 0.020 | 0.020 | 89 | 89 | x |
| COMPARATIVE EXAMPLE 6 | 0.021 | 0.037 | 88 | 87 | x |

Although the embodiments of the present invention have been described in detail, it is to be understood that the various change, substitutions, and alterations could be made hereto without departing from the spirit and scope of the invention.

What is claimed is:

1. A ceramic electronic device comprising:
a multilayer structure in which each of a plurality of internal electrode layers and each of three or more of dielectric layers of which a main component is ceramic are alternately stacked,
wherein the three or more of dielectric layers include Sn,
wherein a dielectric layer having a smaller Sn concentration is closer to an outermost end in a stacking direction than a dielectric layer having a larger Sn concentration and being located on a center side of the stacking direction, in a relationship of at least two of the three or more of dielectric layers, and
wherein Sn concentrations of dielectric layers from a center dielectric layer to an outermost dielectric layer in the stacking direction gradually gets smaller or gets smaller in steps from the center dielectric layer to the outermost dielectric layer in the stacking direction.

2. The ceramic electronic device as claimed in claim 1, wherein an Sn concentration of an outermost one of the plurality of dielectric layers is smallest, in a part of the plurality of dielectric layers from a center one of the plurality of dielectric layers to the outermost one of the plurality of dielectric layers.

3. The ceramic electronic device as claimed in claim 1, wherein Sn concentrations of dielectric layers from an outermost end to a center side in the stacking direction are smaller than Sn concentrations of remaining dielectric layers on the center side of the stacking direction.

4. The ceramic electronic device as claimed in claim 1, wherein, with respect to Sn concentrations of the three or more of dielectric layers, a ratio of a minimum Sn concentration and a maximum Sn concentration is 2:3 or less.

5. The ceramic electronic device as claimed in claim 1, wherein the three or more of dielectric layers have a perovskite structure,
wherein, with respect to Sn concentrations of the three or more of dielectric layers, a difference between a minimum element ratio of Sn/B site and a maximum element ratio of Sn/B site is 0.001 or more.

6. The ceramic electronic device as claimed in claim 1, wherein a main component ceramic of the three or more of dielectric layers is barium titanate,
wherein a main component metal of the plurality of internal electrode layers is nickel.

7. The ceramic electronic device as claimed in claim 1, wherein thicknesses of the three or more of dielectric layers are 5 μm or less.

8. The ceramic electronic device as claimed in claim 1, wherein Sn concentrations of the three or more of dielectric layers are 5 at % or less.

9. The ceramic electronic device as claimed in claim 1, wherein Sn concentrations of the plurality of internal electrode layers are 0.1 at % or more.

10. A manufacturing method of a ceramic electronic device comprising:
- forming stack units by forming each of internal electrode patterns including metal powder, on each of dielectric green sheets including ceramic powder and an Sn source;
- forming a multilayer structure by stacking three or more of the stack units;
- firing the multilayer structure,
- wherein a dielectric green sheet having a smaller Sn concentration is closer to an outermost end in a stacking direction than a dielectric green sheet having a larger Sn concentration and being located on a center side of the stacking direction, in a relationship of at least two of the dielectric green sheets before the firing, and
- wherein Sn concentrations of dielectric layers from a center dielectric layer to an outermost dielectric layer in the stacking direction gradually gets smaller or gets smaller in steps from the center dielectric layer to the outermost dielectric layer in the stacking direction.

\* \* \* \* \*